(12) United States Patent
Mima et al.

(10) Patent No.: US 9,794,693 B2
(45) Date of Patent: Oct. 17, 2017

(54) ELECTRONIC APPARATUS

(71) Applicant: KYOCERA Corporation, Kyoto-shi, Kyoto (JP)

(72) Inventors: Takayuki Mima, Higashiosaka (JP); Yasuhisa Tsubokawa, Kawanishi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/051,877

(22) Filed: Feb. 24, 2016

(65) Prior Publication Data

US 2016/0173991 A1    Jun. 16, 2016

Related U.S. Application Data

(63) Continuation of application No. PCT/JP2014/072418, filed on Aug. 27, 2014.

(30) Foreign Application Priority Data

Aug. 28, 2013  (JP) .................................. 2013-176851

(51) Int. Cl.
*H04R 1/02* (2006.01)
*H04R 17/00* (2006.01)
(Continued)

(52) U.S. Cl.
CPC .............. *H04R 17/00* (2013.01); *H04M 1/03* (2013.01); *H04R 1/023* (2013.01); *H04R 1/026* (2013.01);
(Continued)

(58) Field of Classification Search
CPC . H04R 17/00; H04R 1/23; H04R 1/26; H04R 1/28; H04R 1/288; H04R 2400/03;
(Continued)

(56) References Cited

U.S. PATENT DOCUMENTS 8,711,111 B2    4/2014   Iwawaki et al.
8,717,314 B2    5/2014   Imai et al.
(Continued)

FOREIGN PATENT DOCUMENTS

JP    2004-336403 A    11/2004
JP    2006-135858 A    5/2006
(Continued)

OTHER PUBLICATIONS

International Search Report and Written Opinion of the International Searching Authority issued by the Japanese Patent Office for International Application No. PCT/JP2014/072418.
(Continued)

*Primary Examiner* — Vivian Chin
*Assistant Examiner* — Ammar Hamid
(74) *Attorney, Agent, or Firm* — Procopio Cory Hargreaves and Savitch LLP

(57) ABSTRACT

An electronic apparatus comprises a housing exposed outside, a piezoelectric vibration element located inside the housing a vibration part having the piezoelectric vibration element in a main surface thereof to be vibrated by the piezoelectric vibration element to generate a sound, and a shock-absorbing part being in contact with the main surface and away from a peripheral edge of the main surface, the piezoelectric vibration element intervening between the shock-absorbing part and the peripheral edge.

15 Claims, 7 Drawing Sheets

(51) Int. Cl.
*H04M 1/03* (2006.01)
*H04R 1/28* (2006.01)

(52) U.S. Cl.
CPC .............. *H04R 1/028* (2013.01); *H04R 1/288* (2013.01); *H04R 2400/03* (2013.01); *H04R 2460/13* (2013.01); *H04R 2499/11* (2013.01)

(58) Field of Classification Search
CPC ... H04R 2460/13; H04R 2499/11; H04M 1/03
USPC .................................................. 381/333, 114
See application file for complete search history.

(56) References Cited

U.S. PATENT DOCUMENTS

| | | | |
|---|---|---|---|
| 2006/0099996 A1* | 5/2006 | Kanai | ...................... H04M 1/03 455/566 |
| 2011/0102341 A1* | 5/2011 | Imai | ...................... G06F 1/1626 345/173 |
| 2011/0242055 A1* | 10/2011 | Kim | ........................ G06F 3/042 345/175 |
| 2015/0326967 A1 | 11/2015 | Otani | |

FOREIGN PATENT DOCUMENTS

| | | |
|---|---|---|
| JP | 2006-352762 A | 12/2006 |
| JP | 2012-227850 A | 4/2011 |
| JP | 2011-107766 A | 6/2011 |
| JP | 2013-131987 A | 7/2013 |

OTHER PUBLICATIONS

Office Action dated May 2, 2017 issued in counterpart Japanese Application No. 2016-113686.
Office Action dated Jul. 18, 2017 issued in counterpart Japanese Application No. 2016-113686.

* cited by examiner

US 9,794,693 B2

ELECTRONIC APPARATUS

The present application is a continuation based on PCT Application No. PCT/JP2014/072418, filed on Aug. 27, 2014, which claims the benefit of Japanese Application No. 2013-176851, filed on Aug. 28, 2013. PCT Application No. PCT/JP2014/072418 is entitled "ELECTRONIC DEVICE" and Japanese Application No. 2013-176851 is entitled "ELECTRONIC APPARATUS". The contents of which are incorporated by reference herein in their entirety.

TECHNICAL FIELD

An embodiment of the present disclosure relates to an electronic apparatus for transmitting a sound to a user.

BACKGROUND ART

Various technologies have conventionally been proposed for electronic apparatuses. For example, there is a technique to vibrate a piezoelectric vibration element, which is attached to a cover panel of a telephone such as a mobile phone and a fixed-line phone, so that a sound is transmitted to a user of the telephone.

SUMMARY

An electronic apparatus is disclosed. In one embodiment, an electronic apparatus comprise: a housing, a piezoelectric vibration element, a vibration part, and a shock-absorbing part. The housing is exposed outside. The piezoelectric vibration element is located inside the housing. The vibration part has the piezoelectric vibration element in a main surface thereof to be vibrated by the piezoelectric vibration element to generate a sound. The shock-absorbing part is in contact with the main surface and away from a peripheral edge of the main surface. The piezoelectric vibration element intervenes between the shock-absorbing part and the peripheral edge.

DESCRIPTION OF EMBODIMENT

<External Appearance of Electronic Apparatus>

An electronic apparatus 100 according to one embodiment shown in drawings is a mobile phone, for example.

Figure 1:
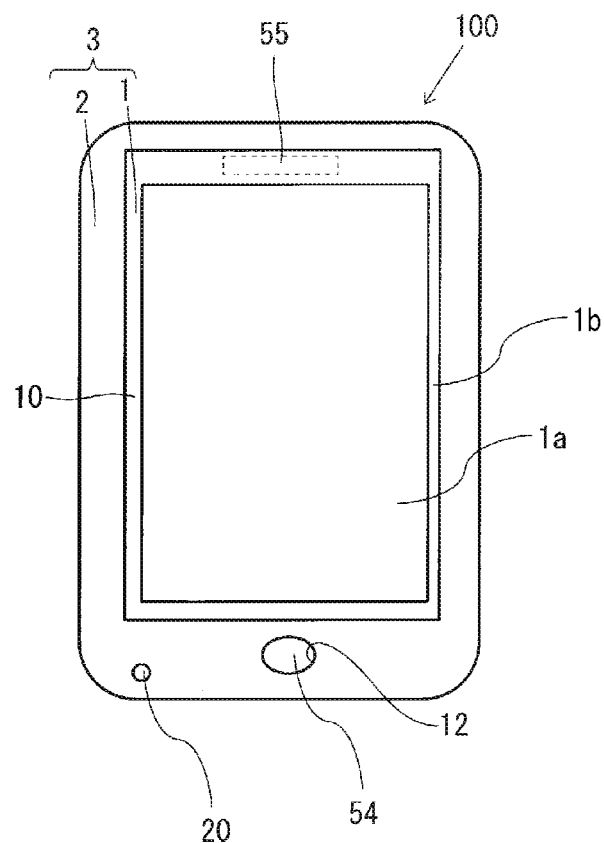
FIG. 1 illustrates a view showing a front surface in an external appearance of an electronic apparatus.

As illustrated in FIG. 1, the electronic apparatus 100 includes a cover panel 1 as a vibration part and a case part 2 as a housing. The cover panel 1 and the case part 2 are combined to constitute an apparatus case 3. The apparatus case 3 may have a plate shape substantially rectangular in a plan view.

The cover panel 1 may have a substantially rectangular shape in a plan view and forms a part in a front part of the electronic apparatus 100 other than a peripheral part thereof.

The cover panel 1 is transparent and is formed of, for example, a glass, an acrylic resin, or a sapphire crystal. Herein, the term "transparent" indicates that a visible light transmittance is 70% to 100%. The above sapphire crystal is made of aluminum oxide (AlO3) crystal and is industrially-manufactured.

The case part 2 forms the peripheral part of the front part, a lateral part, and a rear part of the electronic apparatus 100. The case part 2 is formed of, for example, a polycarbonate resin. A polycarbonate resin, an ABS resin, or a nylon-based resin, for example, is adopted as a resin to form the apparatus case 3. Only one member or a combination of plural members may constitute the case part 2.

The cover panel 1 is provided with a display part 1a on which various types of information such as characters, symbols, and diagrams are displayed. The display part 1a has, for example, a rectangular shape in a plan view. A peripheral part 1b that surrounds a display part 1a in the cover panel 1 may be black through, for example, application of a film, thereby serving as a non-display part on which no information is displayed. Attached to an inner main surface of the cover panel 1 is a touch panel 53, which will be described below. The user can provide various instructions to the electronic apparatus 100 by operating the display part 1a of the cover panel 1 with his/her finger.

Provided in the apparatus case 3 is an operation module 54 such as an operation button. The operation button is a so-called "hard key". A surface of the operation button is exposed from a lower-side edge portion of an outer main surface 10 of the cover panel 1. Plural operation buttons may also be provided in the apparatus case 3.

Provided inside the apparatus case 3 is a piezoelectric vibration element 55 described below, as illustrated in FIG. 1.

Provided in the apparatus case 3 is a microphone hole 20, as illustrated in FIG. 1.

Figure 2:
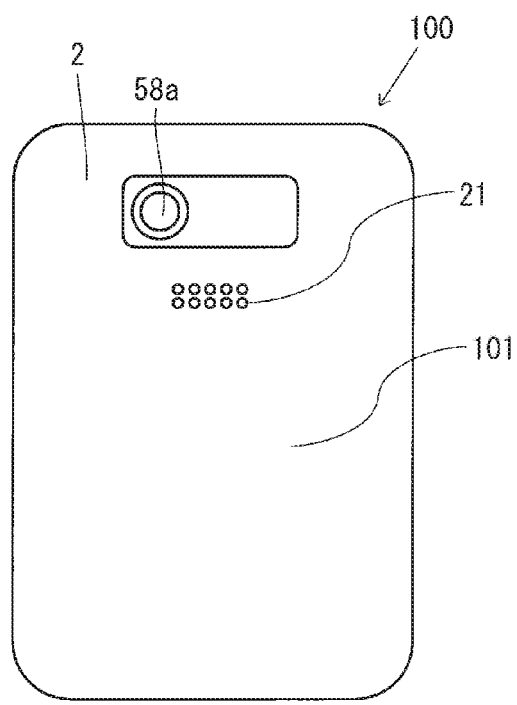
FIG. 2 illustrates a view showing a rear surface in the external appearance of the electronic apparatus.

Provided in a rear surface 101 of the electronic apparatus 100, in other words, in a rear surface of the apparatus case 3 is a speaker hole 21, as illustrated in FIG. 2. An imaging lens 58a which is included in an imaging module 58 described below is exposed from the rear surface 101 of the electronic apparatus 100.

Although the speaker hole 21 is illustrated to output a sound from a speaker as an example of FIG. 2, there is no need to provide the speaker hole 21 when a film speaker provided with a piezoelectric vibration element, for example, is adopted as the speaker.

Although the microphone hole 20 is provided to collect a sound in the microphone in an example of FIG. 1, there is no need to provide the microphone hole 20 when the sound can be converted into an electrical signal without a hole.

<Electrical Configuration of Electronic Apparatus>

Figure 3:
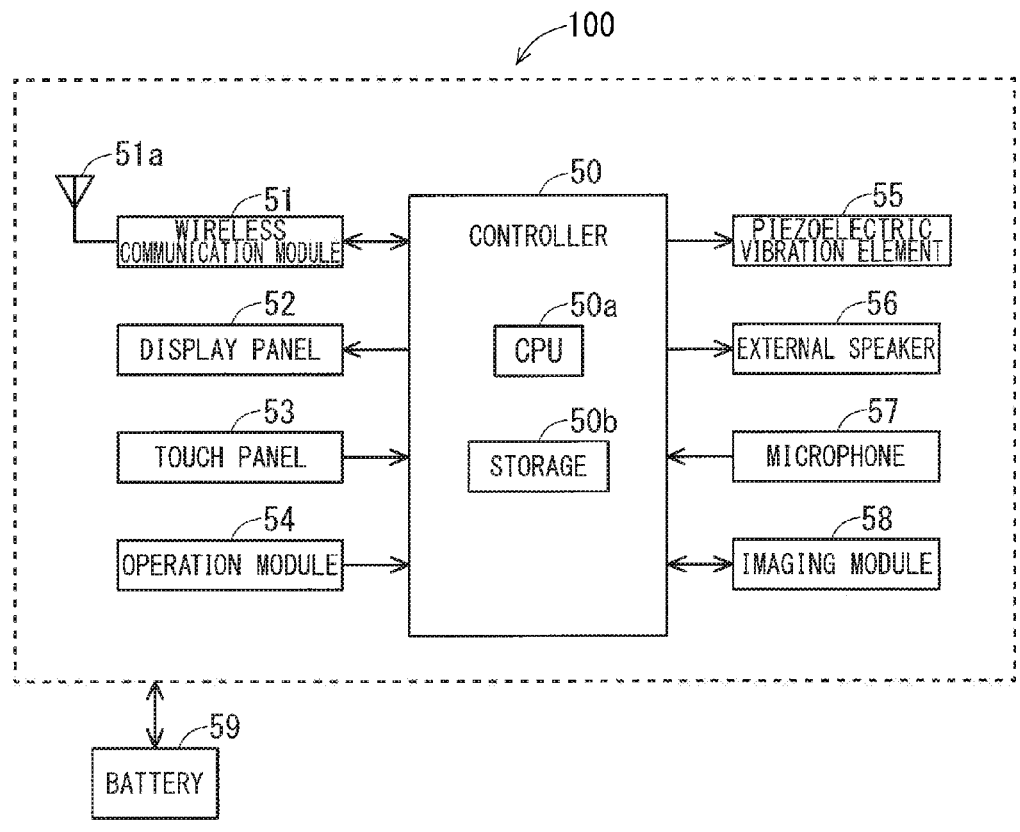
FIG. 3 illustrates a block diagram showing an electrical configuration of the electronic apparatus.

FIG. 3 is a block diagram illustrating an electrical configuration of the electronic apparatus 100. As illustrated in FIG. 3, the electronic apparatus 100 includes a controller 50, a wireless communication module 51, a display panel 52 as a display, the touch panel 53 as a proximity detector, the operation module 54, the piezoelectric vibration element 55, an external speaker 56, a microphone 57, the imaging module 58, and a battery 59. The apparatus case 3 houses these components.

The controller 50 mainly includes a CPU 50a and a storage 50b, and can control other components of the electronic apparatus 100 to collectively manage the operation of the electronic apparatus 100. The storage 50b is mainly configured with a ROM and a RAM. The CPU 50a can perform various programs in the storage 50b, so that various function blocks are formed in the controller 50.

The wireless communication module 51 can receive, through an antenna 51a, a signal from a mobile phone different from the electronic apparatus 100 or a communication device such as a web server connected to Internet via a base station. The wireless communication module 51 can perform amplification processing and down-conversion processing on the received signal and then outputs a resultant signal to the controller 50. The controller 50 can perform modulation processing or other processing on the received signal that has been input, to thereby obtain a sound signal indicative of sound or music contained in the received signal. The wireless communication module 51 can also perform up-conversion processing and amplification processing on a transmission signal including the sound signal or the like that has been generated by the controller 50, to thereby wirelessly transmit the processed transmission signal from the antenna 51a. The transmission signal from the antenna 51a is received, via the base station, by a mobile phone different from the electronic apparatus 100 or a communication device connected to the Internet.

The display panel 52 as the display is, for example, a liquid crystal display panel or an organic EL panel, and can display various types of information such as characters, symbols, and graphics under control of the controller 50. The information, which is to be displayed on the display panel 52, is displayed in the display part 1a of the cover panel 1 to be visible to the user of the electronic apparatus 100.

The touch panel 53 as the proximity detector is, for example, a projected capacitive type touch panel and detects an operation performed by the user with the display part 1a of the cover panel 1. The touch panel 53 is attached to the inner main surface of the cover panel 1 and includes two sheet-like electrode sensors disposed to face each other. The two electrode sensors are attached together with a transparent adhesive sheet.

Formed in one of the electrode sensors are a plurality of elongated X electrodes that extend in an X-axis direction (for example, the horizontal direction of the electronic apparatus 100) and are disposed parallel to one another. Formed in the other electrode sensor are a plurality of elongated Y electrodes that extend in a Y-axis direction (for example, the vertical direction of the electronic apparatus 100) and are disposed parallel to one another. When a user's finger comes into contact with the display part 1a of the cover panel 1, a capacitance between the X electrode and the Y electrode located below the contact portion changes, so that the touch panel 53 can detect the operation on the display part 1a of the cover panel 1. A change in the capacitance between the X electrode and the Y electrode, which occurs in the touch panel 53, is transmitted to the controller 50. The controller 50 can identify, based on the capacitance change, the content of the operation made on the display part 1a of the cover panel 1, and perform the operation corresponding to the identified content.

The touch panel is included as the proximity detector as described above, however, one embodiment is not limited to the touch panel. For example, the proximity detector also includes a tactile sensor which vibrates or transmits a sensation of touching a projection, for example, to the user's finger in response to a contact of the user's finger. A sensor as the proximity detector is not limited to one detecting the contact such as the touch panel, but a sensor which can detect the proximity, even without the contact, is also included in the proximity detector. For example, a proximity sensor is included. A capacitive type proximity detection device which can receive the capacitance change more sensitively than the capacitive type touch panel is also included.

When the user presses the operation button, the operation module 54 outputs to the controller 50 an operation signal indicating that the operation button has been pressed. The controller 50 identifies, based on the input operation signal, whether or not the operation button has been operated and then performs the operation corresponding to the operation button that has been operated.

The piezoelectric vibration element 55 can transmit the received sound to the user of the electronic apparatus 100. The piezoelectric vibration element 55 is vibrated by the drive voltage applied from the controller 50. The controller 50 can generate a drive voltage based on a sound signal which indicates the received sound, and then apply the drive voltage to the piezoelectric vibration element 55. The piezoelectric vibration element 55 is vibrated based on a sound signal, which indicates the received sound, by the controller 50, whereby the received sound is transmitted to the user of the electronic apparatus 100. In the above manner, the controller 50 functions as a drive module to vibrate the piezoelectric vibration element 55 based on the sound signal. The piezoelectric vibration element 55 will be described below in detail.

The external speaker 56 converts an electrical sound signal from the controller 50 into sound and then outputs the sound. The sound output from the external speaker 56 is output to the outside through the speaker hole 21 provided in the rear surface 101 of the electronic apparatus 100.

The microphone 57 converts the sound input from the outside of the electronic apparatus 100 into an electrical sound signal and then outputs the electrical sound signal to the controller 50. The sound from the outside of the electronic apparatus 100 is taken inside the electronic apparatus 100 through the microphone hole 20 provided in the rear surface 101 of the electronic apparatus 100 to be input to the microphone 57.

The imaging module 58 is configured with the imaging lens 58a, an image sensor, and the like, and takes a still image and a moving image under the control of the controller 50.

The battery 59 outputs a power for the electronic apparatus 100. The power output from the battery 59 is supplied to respective electronic components included in the controller 50, the wireless communication module 51, and the like included in the electronic apparatus 100.

<Details of Piezoelectric Vibration Element>

Figure 4:
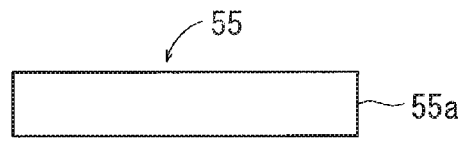
FIG. 4 illustrates a plan view showing a piezoelectric vibration element.
Figure 5:
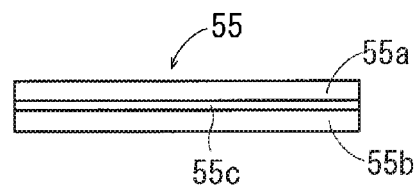
FIG. 5 illustrates a side view showing the piezoelectric vibration element.

FIGS. 4 and 5 are a top view and a side view illustrating a structure of the piezoelectric vibration element 55, respectively. As illustrated in FIGS. 4 and 5, the piezoelectric vibration element 55 may have a long shape in one direction. To be specific, the piezoelectric vibration element 55 may have an elongated plate shape rectangular in a plan view.

A thickness of the piezoelectric vibration element 55 may be 0.5 to 0.8 mm. A long side of the piezoelectric vibration element 55 may be 10 to 20 mm, and a short side thereof may be 2 to 5 mm in a plan view.

The piezoelectric vibration element 55 has a bimorph structure, for example, and includes a first piezoelectric plate 55a and a second piezoelectric plate 55b attached to each other with a shim material 55c therebetween.

In the piezoelectric vibration element 55, a positive voltage is applied to the first piezoelectric plate 55a and a negative voltage is applied to the second piezoelectric plate 55b, so that the first piezoelectric plate 55a expands in the long-side direction and the second piezoelectric plate 55b contracts in the long-side direction. This causes, as illustrated in FIG. 6, the piezoelectric vibration element 55 to flex toward the first piezoelectric plate 55a in a convex manner.

In the piezoelectric vibration element 55, meanwhile, a negative voltage is applied to the first piezoelectric plate 55a and a positive voltage is applied to the second piezoelectric plate 55b, so that the first piezoelectric plate 55a contracts in the long-side direction and the second piezoelectric plate 55b expands in the long-side direction. This causes, as illustrated in FIG. 7, the piezoelectric vibration element 55 to flex toward the second piezoelectric plate 55b in a convex manner.

Figure 6:
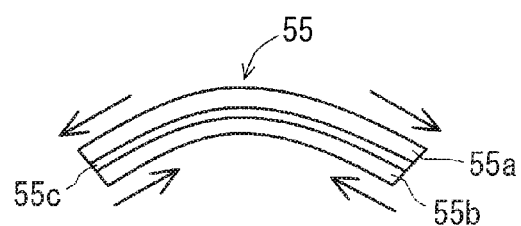
FIG. 6 illustrates a view showing a state where the piezoelectric vibration element is bent.
Figure 7:
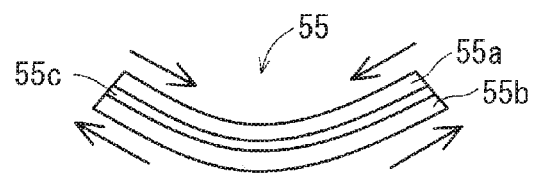
FIG. 7 illustrates another view showing the state where the piezoelectric vibration element is bent.

The piezoelectric vibration element 55 alternately enters the state of FIG. 6 and the state of FIG. 7, thereby producing flexural vibrations. The controller 50 causes an AC voltage, which alternates between positive and negative voltages, to be applied between the first piezoelectric plate 55a and the second piezoelectric plate 55b, causing the piezoelectric vibration element 55 to produce flexural vibrations.

While the piezoelectric vibration element 55 illustrated in FIGS. 5 to 7 is provided with a single structure configured with the first piezoelectric plate 55a and the second piezoelectric plate 55b that are attached with the shim material 55c sandwiched therebetween, a plurality of the above-mentioned structures may be laminated.

The piezoelectric vibration element 55 may be made of a piezoelectric ceramic material or an organic piezoelectric material such as polyvinylidene fluoride and polylactic acid. Specifically, when the piezoelectric vibration element 55 is made of the organic piezoelectric material, a polylactic acid film, for example, is used as each of the first piezoelectric plate 55a and the second piezoelectric plate 55b and laminated. In addition, a transparent electrode such as ITO (Indium-Tin-Oxide, that is to say, indium tin oxide), for example, may be used as the electrode.

<Generation of Received Sound by Vibration of Piezoelectric Vibration Element>

In one embodiment, the piezoelectric vibration element 55 causes the cover panel 1 to vibrate, so that air conducted sound and tissue conduction sound are transmitted to the user from the cover panel 1. In other words, the vibrations of the piezoelectric vibration element 55 itself are transmitted to the vibration part such as the cover panel 1, allowing for the transmission of air conducted sound and tissue conduction sound to the user from the cover panel 1.

Herein, the air conducted sound is the sound recognized by a human brain when a sound wave (air vibrations), which has entered the external auditory meatus (so-called "earhole"), causes an eardrum to vibrate. Meanwhile, the tissue conduction sound is the sound recognized by the human brain when an auricle cartilage is vibrated and vibrations of the auricle cartilage are transmitted to the eardrum, which causes the eardrum to vibrate. The air conducted sound and tissue conduction sound will now be described in detail.

Figure 8:
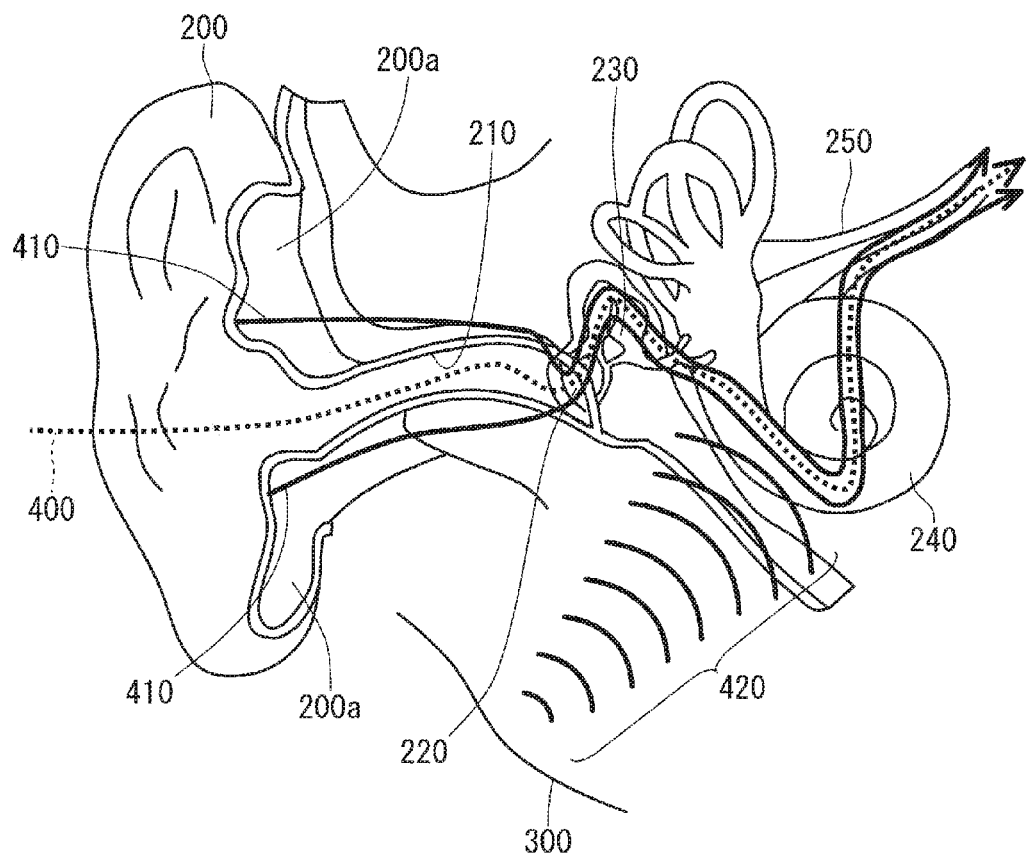
FIG. 8 illustrates a view for describing air conducted sound and tissue conduction sound.

FIG. 8 is a drawing for describing the air conducted sound and tissue conduction sound. FIG. 8 illustrates the structure of the user's ear of the electronic apparatus 100. In FIG. 8, a dashed line 400 indicates a conductive path of a sound signal (sound information) when the air conducted sound is recognized by the brain, and a solid line 410 indicates a conductive path of a sound signal when the tissue conduction sound is recognized by the brain.

When the piezoelectric vibration element 55 mounted on the cover panel 1 is vibrated based on an electrical sound signal indicative of received sound, the cover panel 1 vibrates, whereby a sound wave is output from the cover panel 1. When the user has the electronic apparatus 100 in his/her hand and brings the cover panel 1 of the electronic apparatus 100 close to an auricle 200 of the user or holds the cover panel 1 of the electronic apparatus 100 to the auricle 200 of the user, the sound wave output from the cover panel 1 enters an external auditory meatus 210. The sound wave from the cover panel 1 travels through the external auditory meatus 210 and causes an eardrum 220 to vibrate. The vibrations of the eardrum 220 are transmitted to an auditory ossicle 230, causing the auditory ossicle 230 to vibrate. Then, the vibrations of the auditory ossicle 230 are transmitted to a cochlea 240 and are then converted into an electrical signal in the cochlea 240. The electrical signal is transmitted to the brain through an auditory nerve 250, so that the brain recognizes the received sound. In this manner, the air conducted sound is transmitted from the cover panel 1 to the user.

When the user has the electronic apparatus 100 in his/her hand and holds the cover panel 1 of the electronic apparatus 100 to the auricle 200 of the user, an auricle cartilage 200a is vibrated by the cover panel 1 vibrated by the piezoelectric vibration element 55. The vibrations of the auricle cartilage 200a are transmitted to the eardrum 220, causing the eardrum 220 to vibrate. The vibrations of the eardrum 220 are transmitted to the auditory ossicle 230, causing the auditory ossicle 230 to vibrate. The vibrations of the auditory ossicle 230 are then transmitted to the cochlea 240 and are then converted into an electrical signal by the cochlea 240. The electrical signal is transmitted to the brain through the auditory nerve 250, whereby the brain recognizes the received sound. In this manner, the tissue conduction sound is transmitted from the cover panel 1 to the user.

Bone-conducted sound (also referred to as "bone conduction sound") is the sound recognized by the human brain when the skull is vibrated and the vibrations of the skull directly stimulate the inner ear such as the cochlea. In FIG. 8, illustrating the case in which, for example, a mandibular bone 300 is vibrated, a plurality of arcs 420 indicate a transmission path of a sound signal when the bone conduction sound is recognized by the brain.

As described above, in the electronic apparatus 100 according to one embodiment, the piezoelectric vibration element 55 appropriately vibrates the cover panel 1 on the front surface, in other words, the piezoelectric vibration element 55 appropriately transmits the vibrations of the piezoelectric vibration element 55 itself to the cover panel 1 on the front side, so that the air conducted sound and tissue conduction sound can be transmitted from the cover panel 1 to the user of the electronic apparatus 100. The structure of the piezoelectric vibration element 55 according to one embodiment is contrived to appropriately transmit the air conducted sound and tissue conduction sound to the user. Various advantages can be achieved by configuring the electronic apparatus 100 to transmit the air conducted sound and tissue conduction sound to the user.

For large ambient noise, the user can make it difficult to hear the ambient noise by putting his/her ear strongly to the cover panel 1 while turning up the volume of the tissue conduction sound. This enables the user to appropriately have a telephone conversation even if the ambient noise is large.

Even while wearing earplugs or earphones in his/her ears, the user can recognize the received sound from the electronic apparatus 100 by holding the cover panel 1 to his/her ear (more specifically, auricle). Alternatively, even while wearing headphone in his/her ears, the user can recognize the received sound from the electronic apparatus 100 by holding the cover panel 1 to the headphones.

<Arrangement of Piezoelectric Vibration Element>

Figure 9:
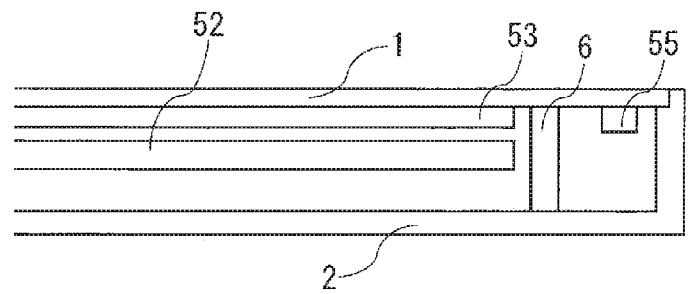
FIG. 9 illustrates a sectional view of the electronic apparatus.
Figure 10:
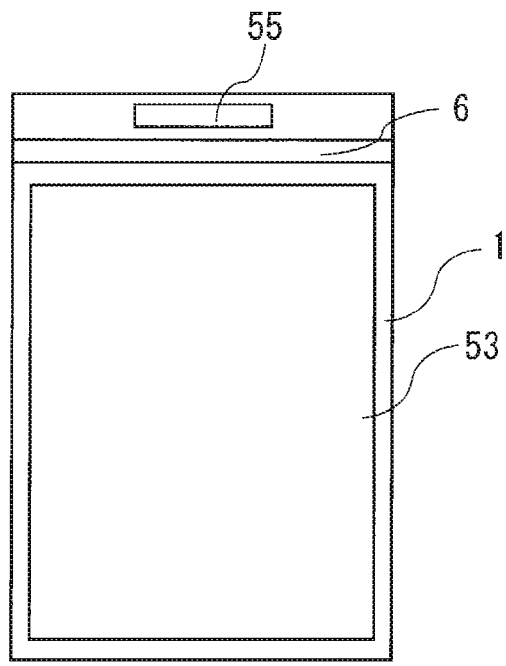
FIG. 10 illustrates a view showing a cover panel 1, a shock-absorbing part 6, a touch panel 53, and a piezoelectric vibration element 55 when the electronic apparatus is viewed from a rear surface side of the cover panel 1 in a plan view.

FIG. 9 is a view illustrating a cross-sectional structure in the vertical direction (long-side direction) of the electronic apparatus 100. An illustration of a lower side of the electronic apparatus 100 is omitted. FIG. 10 is a plan view of the cover panel 1 as the vibration part when viewed from a rear surface side of the cover panel 1. The touch panel 53 as the proximity detector is attached to the rear surface of the cover panel 1 so as to face the display part 1a (refer to FIG. 1) of the cover panel 1. The display panel 52 is disposed to face the cover panel 1 and the touch panel 53. Although an illustration is omitted, the display panel 52 is fixed inside the electronic apparatus 100. A part of the surface of the cover panel 1, which overlaps with the display panel 52 in a plan view, serves as the display part 1a (refer to FIG. 1).

There may be a gap between the touch panel 53 and the display panel 52, or the touch panel 53 may be in contact with the display panel 52. The gap provided between the touch panel 53 and the display panel 52 in the manner of one embodiment can suppress the disturbance of the display panel 52 caused by the cover panel 1 contacting the display panel 52 (to be exact, the touch panel 53 may contact the display panel 52) even when the cover panel 1 is pressed with the finger or the like by the user and then flexes toward the display panel 52 side.

Provided inside the apparatus case 3 is a printed board on which various components such as the CPU 50a and the microphone 57 are mounted (not shown). The printed board is disposed to face the display panel 52 inside the electronic apparatus 100.

The piezoelectric vibration element 55 is attached to the rear surface of the cover panel 1 with a member such as a double-sided tape or an adhesive.

A shock-absorbing part 6 is in contact with the rear surface (the main surface) of the cover panel 1. A state of "being in contact" can be achieved regardless of whether or not there is an intervening member, such as the double-sided tape or the adhesive, between the rear surface of the cover panel 1 and the shock-absorbing part 6. The shock-absorbing part 6 is located away from a peripheral edge of the rear surface of the cover panel 1 (an upper edge of the cover panel 1 in FIG. 10). Provided is the piezoelectric vibration element 55 between the shock-absorbing part 6 and the peripheral edge of the rear surface of the cover panel 1. According to such an arrangement of the shock-absorbing part 6, a position of a point where a sound volume is maximum in the cover panel 1 can be shifted to an upper side of the electronic apparatus 100 in a longitudinal direction compared to a case that no shock-absorbing part 6 is provided.

When an antenna for a wireless communication is provided in a lower part of the electronic apparatus 100, the point where the sound volume is maximum is preferably located in an upper part of the electronic apparatus 100 to the extent possible in consideration of a problem of SAR (Specific Absorption Rate).

Moreover, when the user holds the electronic apparatus 100 to his/her ear to hear the sound in a telephone conversation, for example, the point where the sound volume is maximum is preferably located in the upper part of the electronic apparatus 100 to the extent possible in view of a position of the ear.

As described above, since the shock-absorbing part 6 is located so that the piezoelectric vibration element 55 is located between the shock-absorbing part 6 and the peripheral edge of the rear surface of the cover panel 1, the point where the sound volume is maximum in the cover panel 1 is shifted to the upper side of the electronic apparatus 100 in the longitudinal direction compared to a conventional case. Accordingly, the point where the sound volume is maximum can be located in the upper part of the electronic apparatus 100 to the extent possible.

The shock-absorbing part 6 includes a cushion material (an elastic material), for example. The shock-absorbing part 6 may be attached to the inner main surface of the cover panel 1 with the double-sided tape attached to one surface of the shock-absorbing part 6. The shock-absorbing part 6 may be attached to an inner surface of the case part 2 with the double-sided tape attached to other surface of the shock-absorbing part 6. The adhesive may be used instead of or together with the double-sided tape.

The cushion material included in the shock-absorbing part 6 includes a foam, for example. A polyolefin-based resin foam, a polyester-based foam, or an urethane foam, for example, may be used as the foam. The double-sided tape included in the shock-absorbing part 6 includes, for example, a double-sided tape whose base material, made of polyester, is provided with an acrylic adhesive on both surfaces thereof.

As illustrated in FIG. 10, the shock-absorbing part 6 may be provided from one edge to the other of the cover panel 1, dividing the cover panel 1 into two or more regions.

Normally, the rear surface of the cover panel 1 is provided not only with the piezoelectric vibration element 55 but with other member such as the touch panel 53, for example. Accordingly, the vibration from the piezoelectric vibration element 55 may affect the other member. As illustrated in FIG. 10, the shock-absorbing part 6 is provided on the rear surface of the cover panel 1 to cause the piezoelectric vibration element 55 to intervene between the shock-absorbing part 6 and the peripheral edge of the cover panel 1, so that the vibrations of the cover panel 1 generated by the piezoelectric vibration element 55 can hardly be transmitted to the other material such as the touch panel 53.

Figure 11:
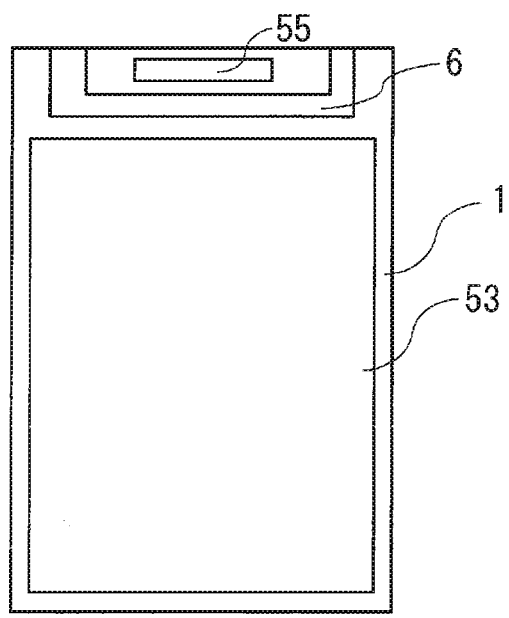
FIG. 11 illustrates a view of a modification example of FIG. 10 showing the cover panel 1, the shock-absorbing part 6, the touch panel 53, and the piezoelectric vibration element 55 when the electronic apparatus is viewed from the rear surface side of the cover panel 1 in a plan view.

As a modification example of FIG. 10, the piezoelectric vibration element 55 may be surrounded by the shock-absorbing part 6 to constitute a region having the piezoelectric vibration element 55 and an outer region thereof as illustrated in FIG. 11. According to such an arrangement of the shock-absorbing part 6 as illustrated in FIG. 11, the point where the sound volume is maximum, caused by the vibrations of the cover panel 1, can be shifted to the upper edge of the electronic apparatus 100 and a center of the cover panel 1. Moreover, the above configuration can reduce the possibility that dust or the like enters the region where the piezoelectric vibration element 55 is provided. In the example in FIG. 11, the three sides of the piezoelectric vibration element 55 are surrounded by the shock-absorbing part 6, however, the four sides of the piezoelectric vibration element 55 may also be surrounded, for example.

Figure 12:
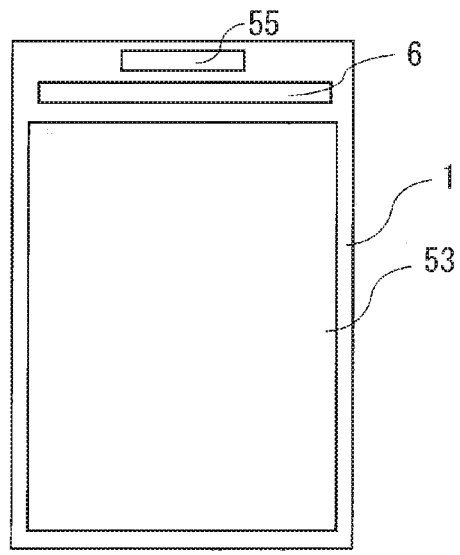
FIG. 12 illustrates a view of another modification example of FIG. 10 showing the cover panel 1, the shock-absorbing part 6, the touch panel 53, and the piezoelectric vibration element 55 when the electronic apparatus is viewed from the rear surface side of the cover panel 1 in a plan view.

Although FIGS. 9, 10, and 11 illustrate the specific examples of the shock-absorbing part 6 dividing the cover panel 1 into the plurality of regions, the shock-absorbing part 6 may not be provided from one edge to the other of the cover panel 1 as illustrated in FIG. 12, for example.

Figure 13:
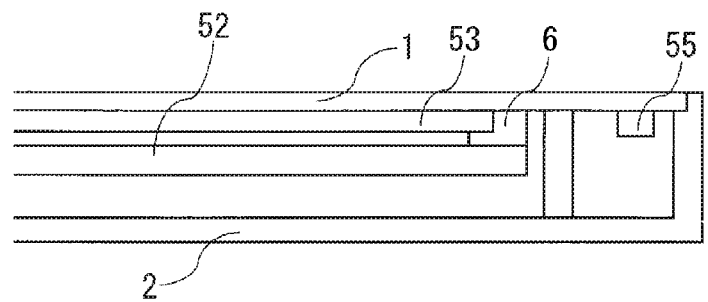
FIG. 13 illustrates a view showing a modification example of FIG. 9.
Figure 14:
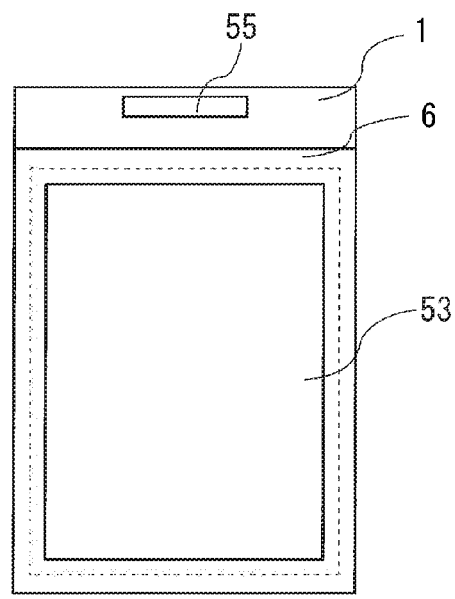
FIG. 14 illustrates a view showing a modification example of FIG. 10.

The shock-absorbing part 6 may also have a configuration of specific examples illustrated in FIGS. 13 and 14. In FIG. 13, an illustration of the lower side of the electronic apparatus 100 is omitted. In the electronic apparatus 100 illustrated in FIG. 13, the shock-absorbing part 6 intervenes between the touch panel 53 and the display panel 52 and is also contact with the rear surface of the cover panel 1. In FIG. 13, the touch panel 53 applies pressure on the shock-absorbing part 6 attached to the display panel 52, so that part of the shock-absorbing part 6 which comes out from between the touch panel 53 and the display panel 52 is in contact with the rear surface of the cover panel 1. A dotted line in FIG. 14 indicates an outline of the touch panel 53, and actually, the outline of the touch panel 53 is covered by the shock-absorbing part 6 and thus not seen.

As illustrated in FIG. 13, the shock-absorbing part 6 located between the display panel 52 and the touch panel 53 can suppress the disturbance of the display panel 52 caused by the touch panel 53 contacting the display panel 52 even when the cover panel 1 is pressed with the finger or the like by the user and then flexes toward the display panel 52 side. Moreover, since the shock-absorbing part 6 is in contact with the rear surface of the cover panel 1 to cause the piezoelectric vibration element 55 to intervene between the shock-absorbing part 6 and the upper edge of the cover panel 1, the point where the sound volume is maximum in the cover panel 1 can be shifted to the upper edge side of the electronic apparatus 100 in the longitudinal direction.

Figure 15:
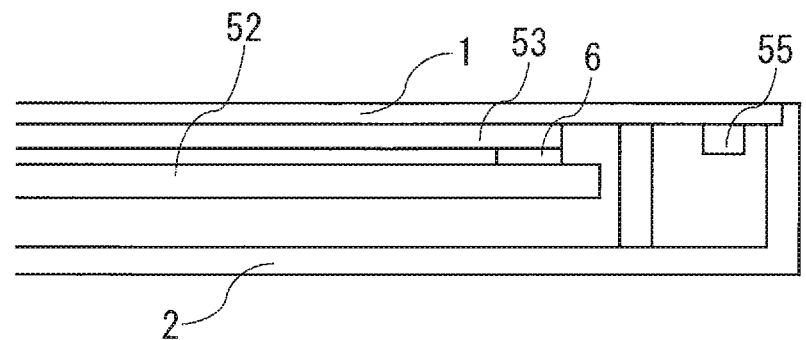
FIG. 15 illustrates a view showing a comparison example of the electronic apparatus shown in FIG. 13.
Figure 16:
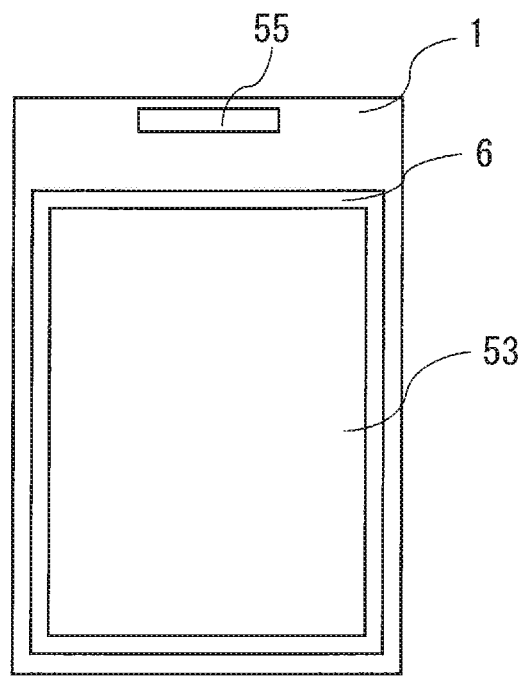
FIG. 16 illustrates a view showing a comparison example of the electronic apparatus shown in FIG. 14.

Experiments are performed using the electronic apparatuses 100 in FIGS. 13 to 16 to show an effect of the shock-absorbing part 6. The shock-absorbing parts 6 in the electronic apparatuses 100 of FIGS. 15 and 16 are not in contact with the rear surface of the cover panel 1.

Figure 17:
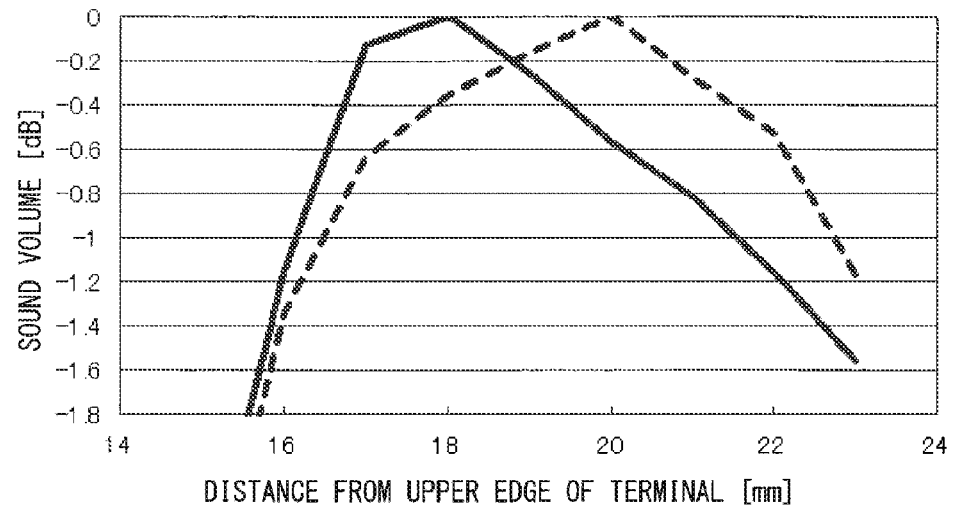
FIG. 17 illustrates a graph showing a maximum sound volume point corresponding to a distance from an upper edge of the electronic apparatus for each electronic apparatus shown in FIGS. 13 to 16.

A solid line in FIG. 17 shows data obtained by measuring a sound volume at a position away from the upper edge of the cover panel 1 by a specified distance as an example of FIGS. 13 and 14. A dotted line in FIG. 17 shows data obtained by measuring a sound volume, in the same manner, at a position away from the upper edge of the cover panel 1 by a specified distance as an example of FIGS. 15 and 16 for comparison.

The measurement of data in FIG. 17 is described hereinafter.

Each cover panel 1 in FIGS. 13 to 16 is made of reinforced glass. The cover panel 1 has a longitudinal length of 118 mm, a lateral length of 60 mm, and a thickness of 0.55 mm. The piezoelectric vibration element 55 has a longitudinal length of 3.3 mm and a thickness of 0.88 mm. A center of the piezoelectric vibration element 55 is located 8.8 mm away from the upper edge of the electronic apparatus 100. An upper edge of the shock-absorbing part 6 is located 14.3 mm away from the upper edge of the electronic apparatus 100. The shock-absorbing part 6 has a width of 5.5 mm in the same direction as the longitudinal direction of the electronic apparatus 100.

The example of FIGS. 15 and 16 has the same configuration as that of FIGS. 13 and 14 except that the shock-absorbing part 6 is not in contact with the rear surface of the cover panel 1.

The sound volume is measured at each point in the cover panel 1 using the electronic apparatuses 100 of FIGS. 13 to 16. The sound volume is measured at points 15.8 mm to 23 mm away from the upper edge of the cover panel 1 at 0.2 mm interval.

Using HATS manufactured by Brüel & Kjær Sound & Vibration Measurement A/S as a measuring instrument, FIG. 17 is obtained by plotting each sound volume point, setting a sound volume maximum point as 0 dB, from values obtained by performing RLR measurement in an anechoic chamber environment. The RLR is an abbreviation of Receive Loudness Rating, and the RLR measurement follows regulations of 3GPP2.

In the specific example (the solid line) of FIG. 17, when the distances from the upper edge of the terminal are 15 mm, 16 mm, 17 mm, 18 mm, 19 mm, 20 mm, 21 mm, and 22 mm, the sound volumes are −2.66 dB, −1.16 dB, −0.13 dB, 0 dB, −0.26 dB, −0.57 dB, −0.82 dB, −1.16 dB, and −1.56 dB, respectively.

In the specific example (the dotted line) of FIG. 17, when the distances from the upper edge of the terminal are 15 mm, 16 mm, 17 mm, 18 mm, 19 mm, 20 mm, 21 mm, and 22 mm, the sound volumes are −2.91 dB, −1.35 dB, −0.64 dB, −0.350 dB, −0.16 dB, 0 dB, −0.28 dB, −0.53 dB, and −1.17 dB, respectively.

According to the data of FIG. 17, when the shock-absorbing part 6 is not in contact with the cover panel 1 as shown in FIG. 14, the sound volume reaches its maximum at the point 20 mm away from the upper edge of the electronic apparatus 100. In contrast, when the shock-absorbing part 6 is in contact with the cover panel 1, the sound volume reaches its maximum at the point 18 mm away from the upper edge of the cover panel 1, thus the sound volume maximum point is located closer to the upper edge of the electronic apparatus 100.

In the above manner, when the shock-absorbing part 6 is in contact with the rear surface of the cover panel 1, the sound volume maximum point can be located closer to the upper edge of the cover panel 1, so that a position where the user puts his/her ear can be located in an appropriate position. Moreover, as described above, the reduction in the distance between the upper edge of the cover panel 1 and the sound volume maximum point causes a user's head to keep away from the antenna, which is generally provided in the lower side of the electronic apparatus 100, thereby reducing the influence of SAR.

In addition to the effect of controlling the position of the sound volume maximum point, the shock-absorbing part 6 can achieve a mitigation effect against a shock due to a drop of the electronic apparatus, for example. For example, the distance between the upper edge of the cover panel 1 and the shock-absorbing part 6 (a center part of the shock-absorbing part 6) is preferably set to 2 to 4 times as long as the distance between the upper edge of the cover panel 1 and the piezoelectric vibration element 55 (a center part of the piezoelectric vibration element 55) to achieve the above effect sufficiently.

Described above is the example of the piezoelectric vibration element 55 causing the cover panel 1 to vibrate as the vibration part, however, the present disclosure is not limited to the above configuration, but another vibration part, which is provided with the piezoelectric vibration element 55 and the shock-absorbing part 6, may be provided separately from the cover panel 1, for example. In the present disclosure, the vibration part is not limited to the cover panel.

The vibration part may include a resin panel, a resin film, a glass panel, a glass film, or the like which can sufficiently transmit the vibration generated by the piezoelectric vibration element 55 to the cover panel 1. It is preferable to use a resin material as the vibration part and also use the resin material as the piezoelectric vibration element 55 by reason that the resin material shows a high adhesive property when attached with as the adhesive or the double-sided tape.

Figure 18:
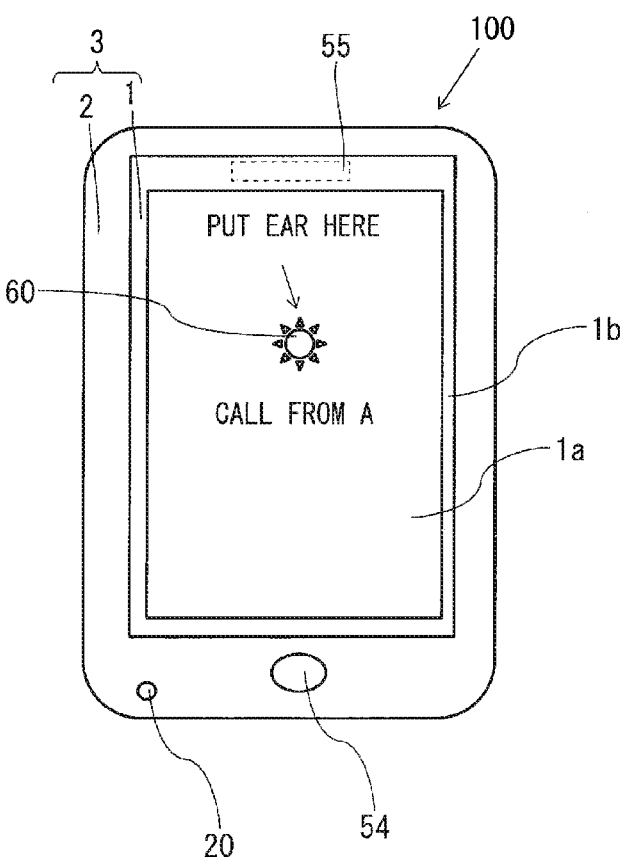
FIG. 18 illustrates a view showing a screen of the electronic apparatus during a telephone conversation.

FIG. 18 illustrates a display screen when the user starts a telephone conversation after an incoming call as an application relating to a sound generation. An image 60 is an image to inform the user of a position where the sound is easy to hear. That is to say, the image 60 is displayed on a position which overlaps with the above sound volume maximum point when viewed from the cover panel 1 side in a plan view. Accordingly, the above configuration can inform the user of the point where the sound volume is large in the cover panel 1. Since the sound is also easy to hear directly above the piezoelectric vibration element 55, the image may also be displayed on a position which overlaps with the piezoelectric vibration element 55 when viewed from the cover panel 1 side in a plan view.

Although the example of FIG. 18 describes the voice communication as the application relating to the sound generation, one embodiment is not limited to the above application, but any application is applicable as long as it generates a sound such as a music reproduction and a moving image reproduction, for example.

<Earpiece Hole (Reception Hole)>

An electronic apparatus such as a mobile phone often has an earpiece hole in the cover panel 1 on the front surface so that the sound, which is output from a receiver (reception speaker) provided inside the electronic apparatus, is taken outside the electronic apparatus.

The electronic apparatus 100 according to one embodiment does not have an earpiece hole (Reception hole) in the cover panel 1 which outputs the sound. That is to say, there is no earpiece hole in the surface of the electronic apparatus 100. Accordingly, there is no need of the processing of making the earpiece hole in the cover panel 1. As a result, a manufacturing cost of the electronic apparatus 100 can be reduced, and a cost reduction of the electronic apparatus 100 can be achieved. Especially when the cover panel 1 is formed of glass, sapphire, or the like, it is hard to make the hole in the cover panel 1, so that the manufacturing cost of the electronic apparatus 100 can be further reduced by not making the earpiece hole in the cover panel 1. The strength of the cover panel 1 can be enhanced by not making the earpiece hole in the cover panel 1. Moreover, freedom in designing the front surface of the cover panel 1 is enhanced by not making the earpiece hole in the cover panel 1. Especially when the cover panel 1 occupies a large part of the front surface of the electronic apparatus 100 as one embodiment, no earpiece hole in the cover panel 1 is quite effective from a standpoint of the design. Since there is no earpiece hole in the surface of the electronic apparatus 100 in one embodiment, no problem that water, dust, or the like enters from the earpiece hole does not occur. Since the electronic apparatus 100 does not need a waterproof structure or dustproof structure for the above problem, the cost reduction of the electronic apparatus 100 can be further achieved.

In one embodiment, the vibrations of the cover panel 1 generate the received sound, so that the received sound can be appropriately transmitted to the user without the earpiece hole in the electronic apparatus 100.

The cover panel 1 according to one embodiment has a hole 12 to expose an operation button 54, however, the hole which exposes the operation button 54 may be made in the case part 2 instead of providing the hole 12 in the cover panel 1. Alternatively, the hole 12 may not be provided in the cover panel 1 by not forming the operation button 54. According to the above configuration, there is no hole in the cover panel 1, so that the cost reduction of the electronic apparatus 100 and the freedom in designing the front surface of the cover panel 1 can be further enhanced.

Although the examples above have been given of the case where the present disclosure is applied to a mobile phone, the present disclosure is also applicable to electronic apparatuses other than mobile phones. The present disclosure is also applicable to, for example, game machines, notebook computers, portable navigation systems.

Although the examples above indicate the mobile phone provided with the touch panel 53 as the electronic apparatus 100, one embodiment is not limited to it, but the input operation may be performed on an electronic apparatus 100 which enables the input operation with hard keys without providing the touch panel 53.

The present disclosure has been described in detail, but the above-mentioned description is illustrative in all aspects and the present invention is not intended to be limited thereto. Various modifications not exemplified are construed to be made without departing from the scope of the present invention.

The invention claimed is:

1. An electronic apparatus comprising:
   a housing;
   a piezoelectric vibration element located inside the housing;
   a vibration part that includes the piezoelectric vibration element on a main surface thereof and is vibrated by the piezoelectric vibration element to generate a sound; and
   a shock-absorbing part that is in contact with the main surface and away from at least one peripheral edge of the main surface,
   wherein the piezoelectric vibration element is positioned, on the main surface, between the shock-absorbing part and the at least one peripheral edge of the main surface, and
   wherein, in a plan view, both the piezoelectric vibration element and the shock-absorbing part are positioned between the at least one peripheral edge and a center of the vibration part, and the shock-absorbing part is positioned in a side of the center of the vibration part with respect to piezoelectric vibration element.

2. An electronic apparatus according to claim 1, further comprising: a proximity detector and a display inside the housing, wherein the shock-absorbing part is located between the proximity detector and the display.

3. An electronic apparatus according to claim 2, wherein part of the shock-absorbing part which comes out from between the proximity detector and the display is in contact with the vibration part.

4. An electronic apparatus according to claim 1, wherein, in the plan view, the electronic apparatus further comprises an antenna for a wireless communication in a lower side of the housing.

5. An electronic apparatus according to claim 1, wherein the shock-absorbing part includes a cushion material.

6. An electronic apparatus according to claim 1, wherein the vibration part comprises a cover panel.

7. An electronic apparatus according to claim 1, wherein when an application which generates a sound is active, an image which informs of a position where a sound is easy to hear is displayed.

8. An electronic apparatus according to claim 4, wherein, in the plan view, the piezoelectric vibration element is positioned on an upper side of the housing, opposite of the lower side of the housing comprising the antenna.

9. An electronic apparatus according to claim 8, wherein, in the plan view, at least a portion of the shock-absorbing part is positioned between the piezoelectric vibration element and the antenna.

10. An electronic apparatus according to claim 1, further comprising a touch panel, wherein, in the plan view, the shock-absorbing part is positioned between the piezoelectric vibration element and the touch panel.

11. An electronic apparatus according to claim 1, wherein an inside of the housing comprises a front surface and a rear surface, and wherein the shock-absorbing part extends from the front surface to the rear surface of the inside of the housing.

12. An electronic apparatus according to claim 1, wherein, in the plan view, the shock-absorbing part surrounds the piezoelectric vibration element on all sides except a side of the piezoelectric vibration element nearest the at least one peripheral edge of the main surface.

13. An electronic apparatus according to claim 1, wherein, in the plan view, in a direction that is orthogonal to the longitudinal direction, the shock-absorbing part extends continuously from one side of the housing to an opposite side of the housing.

14. An electronic apparatus according to claim 1, wherein, in the plan view, a distance between the at least one peripheral edge of the main surface and the shock-absorbing part is at least two times as long as a distance between the at least one peripheral edge of the main surface and the piezoelectric vibration element.

15. An electronic apparatus according to claim 1, further comprising a touch panel positioned on the main surface of the vibration part, wherein, in the plan view, the shock-absorbing part is positioned between the touch panel and the piezoelectric vibration element.

* * * * *